United States Patent [19]
Lee

[11] Patent Number: 5,831,616
[45] Date of Patent: Nov. 3, 1998

[54] APPARATUS, AND METHOD FOR SEARCHING AND RETRIEVING MOVING IMAGE INFORMATION

[75] Inventor: Hee Jong Lee, Seoul, Rep. of Korea

[73] Assignee: Samsung Electronics Co., Ltd., Kyungki-Do, Rep. of Korea

[21] Appl. No.: 808,659

[22] Filed: Feb. 28, 1997

[30] Foreign Application Priority Data

Jun. 21, 1996 [KR] Rep. of Korea ............... 1996 22970

[51] Int. Cl.⁶ .................................................. G06F 3/14
[52] U.S. Cl. ........................... 345/348; 345/340; 345/977
[58] Field of Search .................................. 345/348, 340, 345/341, 342, 343, 344, 345, 346, 347, 349, 350, 352, 35, 339, 326, 11, 330, 329, 338, 328, 327

[56] References Cited

U.S. PATENT DOCUMENTS

| | | | |
|---|---|---|---|
| 5,428,393 | 6/1995 | Enokida | 348/390 |
| 5,432,543 | 7/1995 | Hasegawa et al. | 348/45 |
| 5,489,941 | 2/1996 | Enokida | 348/390 |
| 5,561,796 | 10/1996 | Sakamoto et al. | 707/3 |
| 5,583,791 | 12/1996 | Harigaya et al. | 348/575 |
| 5,646,685 | 7/1997 | Enokida | 348/390 |
| 5,697,885 | 12/1997 | Konomura et al. | 600/109 |
| 5,706,059 | 1/1998 | Ran et al. | 348/699 |
| 5,708,767 | 1/1998 | Yeo et al. | 395/140 |
| 5,721,585 | 2/1998 | Keast et al. | 348/36 |

*Primary Examiner*—Raymond J. Bayerl
*Assistant Examiner*—Steven P. Sax
*Attorney, Agent, or Firm*—Sughrue, Mion, Zinn, Macpeak & Seas, PLLC

[57] ABSTRACT

An apparatus and method for searching and retrieving moving image information by using 3-dimensional icons is disclosed. The method for searching and retrieving moving image information in a computer system having a pointing device, a display unit, and external and internal memories for storing an image file includes the steps of: creating an icon file by selecting a specific frame of the image file, and storing the icon file in the internal memory; creating a main window in the display unit; creating a plurality of command windows within the main window; reading one or more specific icon file from the internal memory according to a moving image information searching command, and generating the specific icon file separated from the command windows by a given distance in the form of a 3-dimensional icon; and executing a corresponding command when any icon is dragged and dropped to any command window area by the pointing device.

6 Claims, 7 Drawing Sheets

APPARATUS, AND METHOD FOR SEARCHING AND RETRIEVING MOVING IMAGE INFORMATION

BACKGROUND OF THE INVENTION

1. Field of the Invention

The present invention relates to an apparatus and method for searching and retrieving moving image information by using icons and, more particularly, to an apparatus and method for searching and retrieving moving image information by using 3-dimensional icons. The present application is based on Korean Application No. 22970/1996, which is incorporated herein by reference.

2. Description of the Related Art

A user interface provides means for mutually exchanging information between a user and a computer through an input device such as a keyboard or a mouse and through an output device such as a display unit. Information of the computer is transferred to the user through the display unit, and a command or data of the user is transferred to the computer through the input device such as the keyboard or the mouse.

A conventional user interface is based on characters which can converse with the computer when the user knows a syntax of the command. Recently, the user interface has developed into a user-oriented graphic interface which can be easily utilized by using graphic information without the necessity of remembering the syntax of the command minutely. Such a technique is disclosed in detail in U.S. Pat. Nos. 5,347,628, 5,349,658 and 5,191,645.

The graphic user interface shows an object by a specified small graphic form. Therefore, it is easier to convey meaning using a graphic user interface than by using characters. That is, the computer can be easily handled by only clicking an icon representing each function by use of the mouse. In the existing computer, the predetermined icons are stored in a memory, and the stored icons are read to appear as a given pattern on the display unit in determined order or to be used for application. As another method, the user can create the icons from object information without using the predetermined icons.

However, although there are no problems when the object shown by the icon is a well-known program, these methods have problems when the object is an image file consisting of accumulated moving image data such as a film. In other words, if the icon is shown as one graphic pattern and a text indicating a file name, it is not easy for the user to guess the contents of an accumulated image. In an image database such as a video server, the conventional icon is not well suited to meeting the original purpose of providing a more familiar user interface. Therefore, a 3-dimensional icon including a temporal concept as well as a spatial concept has been introduced. For example, an icon including a temporal component may be made by using a partial moving image, that is, an initial few frames, first and final frames or frames including an important scene. U.S. Pat. No. 5,123,088, issued to Y. Tonomura et al., entitled, "STORED VIDEO HANDLING TECHNIQUE" describes a process for selectively showing only a few scenes among the image file and a process for selectively showing only a certain part of successive images, in order to retrieve the image file. The former uses images of the frame corresponding to a dramatic portion of the object image or uses images of an initial few frames. The latter utilizes only a certain distinguished interval of the image file.

Consequently, when the user retrieves the image database, since a 2-dimensional icon is represented by only the spatial concept, it is not easy to understand the contents of the image file. The 3-dimensional icon used to solve this problem reads out the entire image file and plays only desired image data, thereby requiring a lot of searching time and a memory of large capacity. That is, when searching for a desired file, since the frames constituting the icon are sequentially displayed after loading the entire image data into the interior of a system or a computer from an external memory device, it takes a long time to retrieve a desired file. Furthermore, since the moving image uses a considerable amount of data (several tens of Mega bytes to hundreds of Mega bytes), it takes a long time to load the data and a searching device occupies much storage space. This may be a serious obstacle when searching a plurality of image files.

SUMMARY OF THE INVENTION

It is an object of the present invention to provide an apparatus and method for supplying more file information to a user by accumulating only a partial frame of a moving image file and constructing a 3-dimensional icon having a temporal component.

It is another object of the present invention to provide an apparatus and method for saving a searching time and a memory of an image file searching device such as a video server by use of a 3-dimensional icon from which the contents of an image file can be intuitionally and rapidly understood.

According to the present invention, a 3-dimensional icon including spatial and temporal information is made to reduce dependence on character information and to enable the user to easily understand the contents of an image file. To use a searching time and memory resources efficiently, the contents of the image file and the contents of an icon file are separated. When searching the image file, only data necessary for the construction of the icon is read, instead of reading the entire image file to the interior of a searching device.

The present invention will be specifically described with reference to the attached drawings in which like reference numerals are used to designate like elements throughout the views.

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. Further, well-known functions and constructions have not been described so as not to obscure the present invention.

Figure 1:
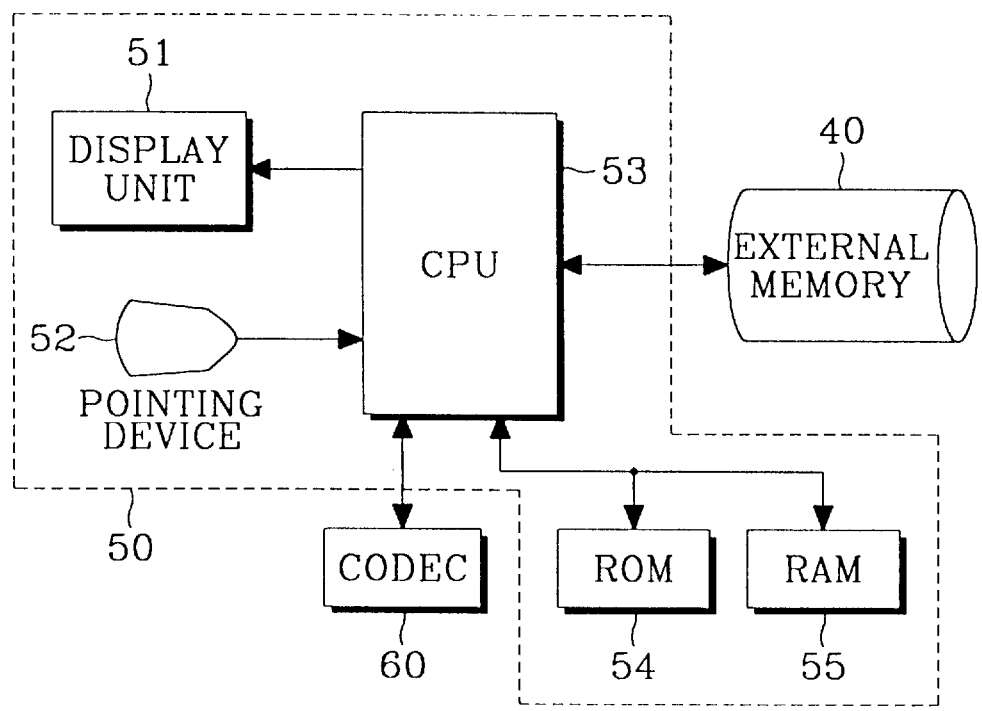
FIG. 1 is a block diagram illustrating the construction of a 3-dimensional information processing system according to the present invention.

Referring to FIG. 1, a 3-dimensional information processing system includes an external memory 40, a codec 60, and a personal computer or a workstation 50 (hereinafter, referred to as a PC) having a random access memory (RAM) 55 and a read only memory (ROM) 54 as internal memories, a central processing unit (CPU) 53, a display unit 51 such as a monitor, and a pointing device 52 (hereinafter, referred to as a mouse).

The physical embodiment of the codec 60 may take the form of a board inserted into the PC 50. The CPU 53, the RAM 54 and the ROM 55 correspond to a searching control part. As an input device for supplying an image to the PC 50, a general video camera or a film scanner which is commercially available may be used. The codec 60 compresses (or codes) an input image or decompresses (or decodes) the compressed image. This module can be constructed by hardware, but may be achieved by software if the performance of the computer is sufficient. Image data is compressed through the codec 60. The codec 60 can compress an original image by using an international standard coding system such as JPEG (Joint Photographics Expert Group) or MPEG (Moving Picture Expert Group) or using some other coding system.

The CPU 53 controls the input and output of an image signal and wholly controls the overall operation of each module within the PC 50. The CPU 53 also makes an icon file. The ROM 54 stores a system program and various application programs. The external memory 40 which is a data storage device of large capacity such as a hard disk is controlled by the CPU 53 and used as a place for storing moving image information, that is, an icon file and an image file. The display unit 51 is a type of monitor and displays a searching window and a control panel for handling the PC 50. The RAM 55 stores the icon file and the image file supplied to the display unit 51.

Figure 2:
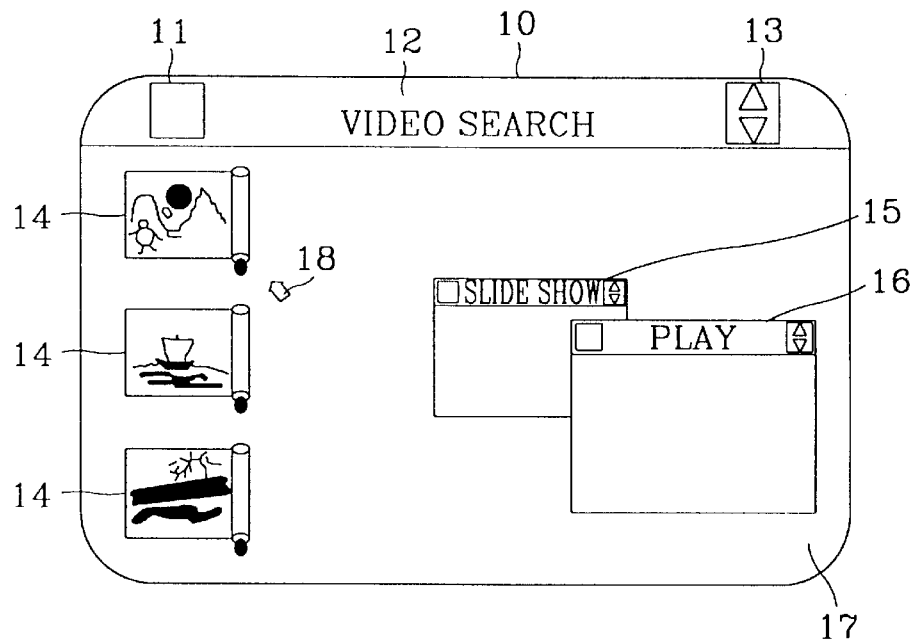
FIG. 2 illustrates a display screen for searching an image file according to the present invention.

FIG. 2 illustrates a display screen for searching the image file. There is provided an image searching window 10. Like a typical windows environment, the image searching window 10 includes a control menu box 10 for carrying out functions such as a modification of a window size, icon display, entire screen display, window close, etc., a title bar 12 for showing a title of a window, a screen display button 13 for minimizing or maximizing the size of a window screen, and a client area 17. In the client area 17, a plurality of icons having the form of a scroll and two command windows, that is, a slide show window 15 and a play window 16 are displayed. A cursor 18 is used to select the icon within the display screen or to move the icon to the command windows by using the mouse 52. This is the same as the manipulation of the icon and the window through the mouse in the known windows environment. The command window executes a command set in that window by dragging and dropping the icon positioned in the client area to its area.

Figure 3A:
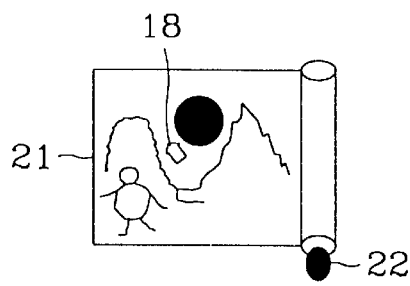
FIGS. 3A and 3B illustrate examples using an animation technique in order to see image data of a temporal component provided by an icon according to the present invention.
Figure 3B:
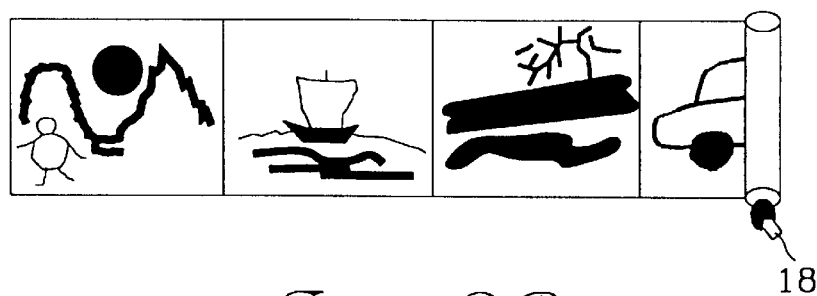

FIGS. 3A and 3B illustrate examples using an animation technique in order to see image data of a temporal component provided by the icon. A 3-dimensional icon shown in FIG. 3A takes the form of a scroll. FIG. 3B shows the 3-dimensional icon taking the form of the spread scroll.

The scroll icon consists of a jacket indicating a cover for distinguishing the icon and a scroll handle 22. To spread the scroll icon, after selecting the scroll handle 22 by use of the cursor 18, the user should drag the mouse 52 to the right to which the scroll is spread while clicking the left button of the mouse 52. By such a dragging operation, the scroll is spread and still images (frames) constituting the icon appear on the display. Such an icon contents seeing function consists of three processes of icon selection, spread and restoration. The size of a spread graphic area is proportional to the distance through which the scroll handle 22 is moved to the right by use of the cursor 18. If it is desired to complete the icon contents viewing function, the user can cause the function to return to the original state by ceasing to press the left button of the mouse 42. In this case, the spread scroll is restored to the original icon state.

When carrying out the icon contents viewing function by pulling out the scroll handle 22, the contents of the scroll icon cannot be sufficiently understood due to the spatial restrictions of the icon. In other words, it is necessary to see the contents of the icon in an area of a sufficient size in order to observe the contents of the icon in detail. To satisfy these requirements, the slide show window 15 shown in FIG. 2 is used. If the icon is dragged and dropped to an area of the slide show window 15, the slide show window 15 displays the still images corresponding to that icon one cut by one cut therewithin, thereby easily searching the image file. In such a case, it would be preferable to use the slide show window 15 when searching all the still images constituting a corresponding icon. When confirming only a few still images, it is quicker to spread the icon by the desired number of times. In order to drag and drop the icon to the slide show window 15, the user should move the cursor 18 to the jacket 21 and drag and drop the mouse 52 to the slide show window 15 while clicking the left button of the mouse 52. This manipulation is known in the graphic user interface as a drag and drop operation. A slide show function has, as parameters, classification information of the image file, a file reading command, an output time interval between frames, and output area information on the display screen.

The play window 16 plays the moving image file corresponding to a selected icon. That is, the image file is played by displaying the image data of the external memory 60 corresponding to an identification (ID) of the selected icon on an area of the play window 16. The contents of the image file are placed within the play window 16 by dragging and dropping the icon of the desired image file to the play window 16. The position and size of the play window 16 can be varied by a method supported in the known windows program.

Figures 4A, 4B:
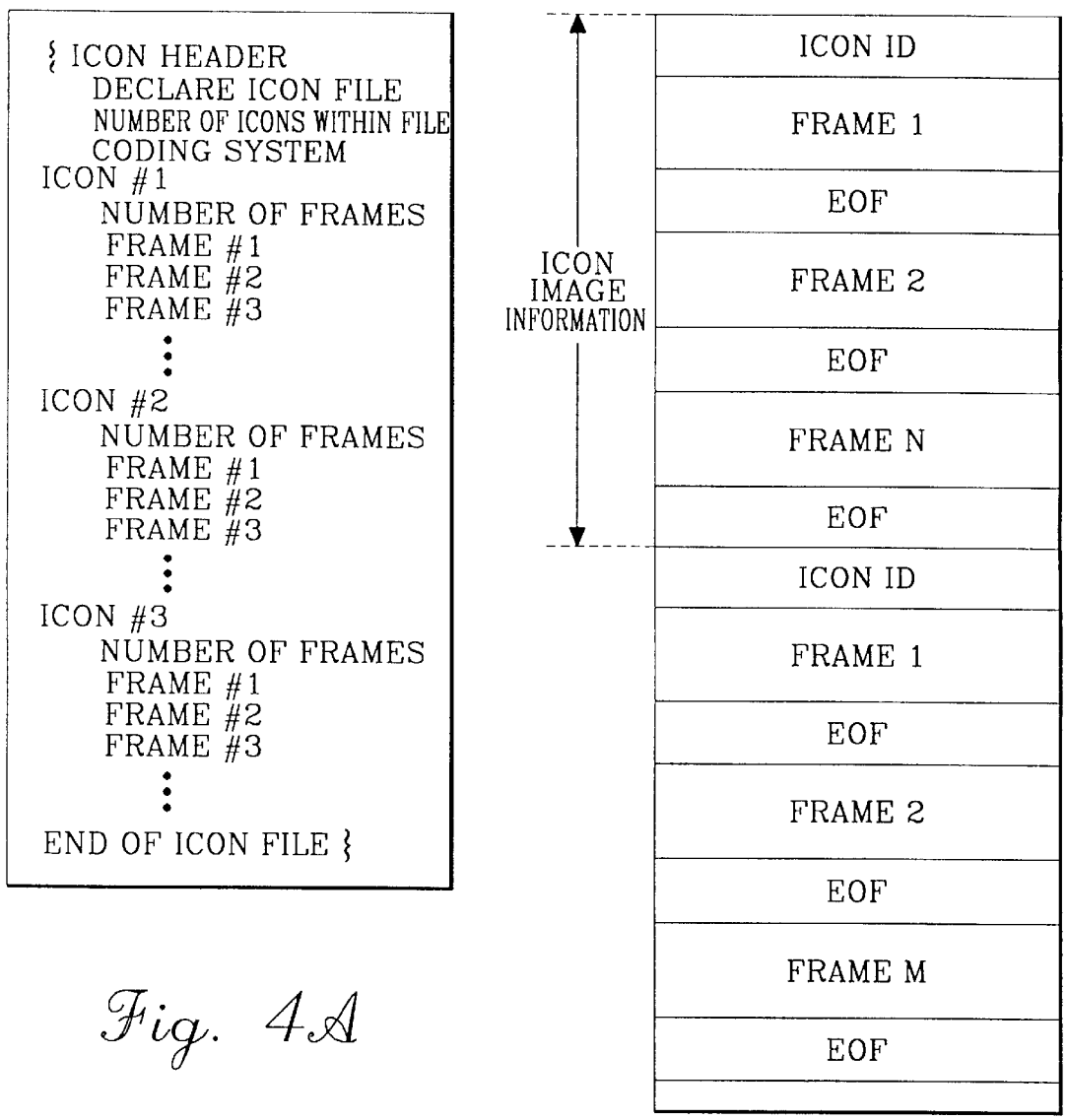
FIGS. 4A and 4B illustrate a format of an icon file according to the present invention.

FIGS. 4A and 4B illustrate a format of the icon file. When a plurality of icons are generated as shown in FIG. 2, the format includes the number of frames for each icon and actual frame data. One icon file declares that file is the icon file at a header of the file, and specifies a parameter indicating the number of the icons within the file and a coding system used to compress the image data of each frame constituting the icon. In the body of the file, the number of frames constituting each icon and the image data of each frame are recorded. The image data of each frame is compressed by software since there is no need to process the image data by real time. If it is necessary to rapidly process the image data, it is desirable to process the image data by hardware.

Figure 5:
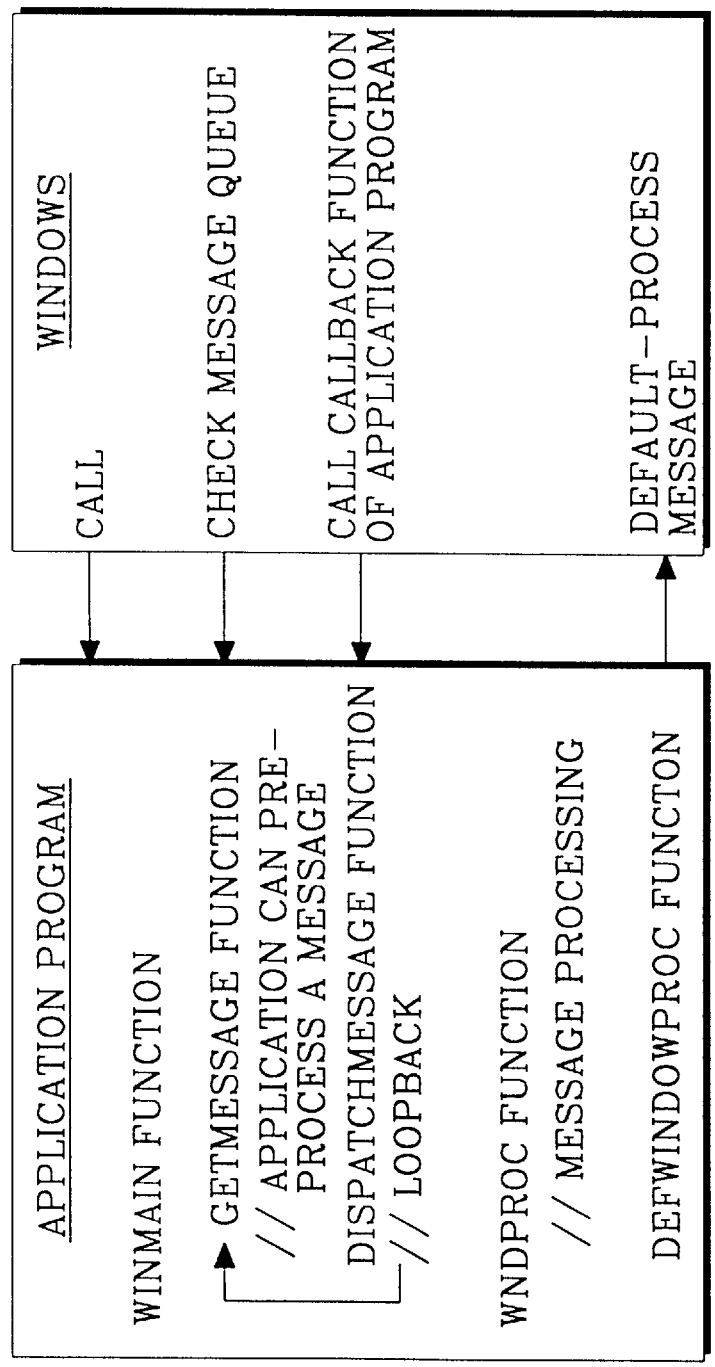
FIG. 5 is illustrates a procedure for executing an application program in relation to Windows.

FIG. 5 shows a procedure for executing an application program in relation to Windows, which is an operating system of Microsoft Corp. In operation, Windows has one system queue and one queue for each application. All messages entering into Windows are stored in an individual queue. The Windows generates a message corresponding to a mouse operation in application Windows, and always operates to know what may happen. In the windows environment, a specific location (for example, INT 16H) of an input device such as a mouse and a keyboard is not used, as it would be in a DOS environment. When the application program is executed, Windows are called and the message is requested. Windows requests the message which is in a first corresponding queue. If Windows is returned from a call, this program translates and executes the message.

Referring back to FIG. 5, if the application program is executed, Windows calls a main function WinMain of this application program and waits for the message. In this main function WinMain, there is a get message function and a dispatch message function. The get message function waits in Windows until an event associated with the application program is generated. If the message is in the queue, control returns to the application program together with the message. The application program receiving the message through the get message function returns the message by calling the dispatch message function. Windows transmits that message to a callback function WndProc. The callback function has the message and implements a procedure corresponding to that message. Each window generated by the application program has each unique callback function. The message defined by the callback function WndProc is again sent to the Windows through a default function DefWindowProc for the last default processing. A main loop is continuously executed unless an escape condition is satisfied.

Figure 6A:
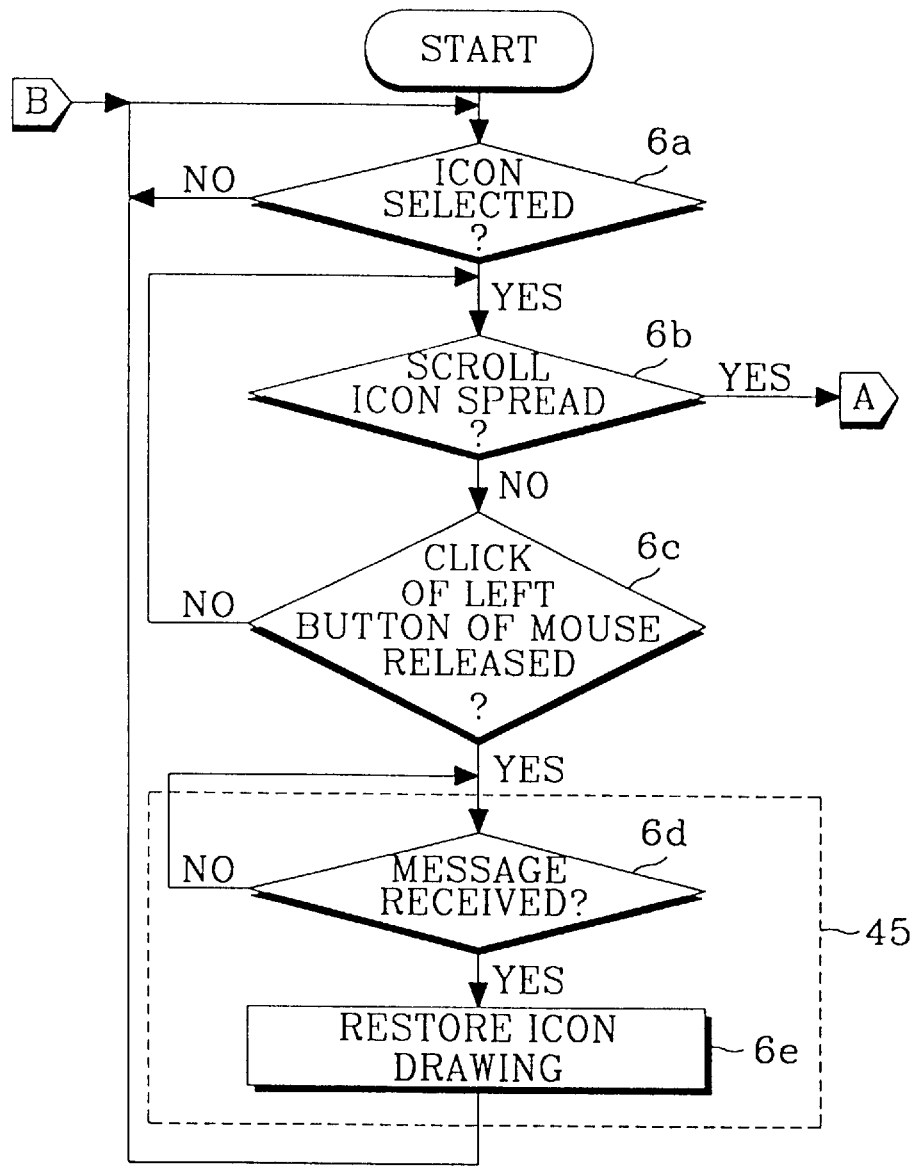
FIGS. 6A and 6B show a flow chart illustrating a procedure for executing an icon contents seeing function according to the present invention.
Figure 6B:
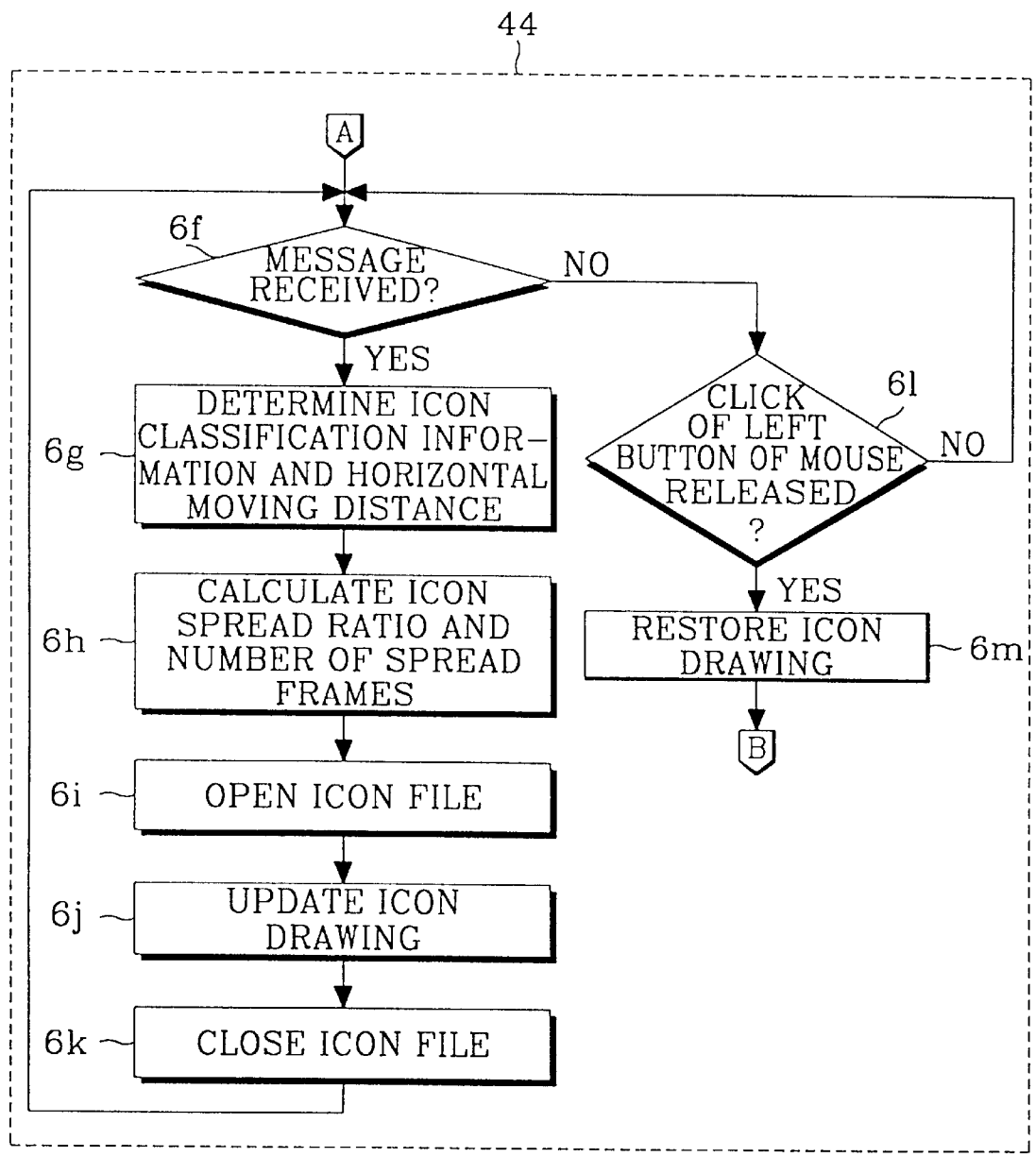
Figure 7:
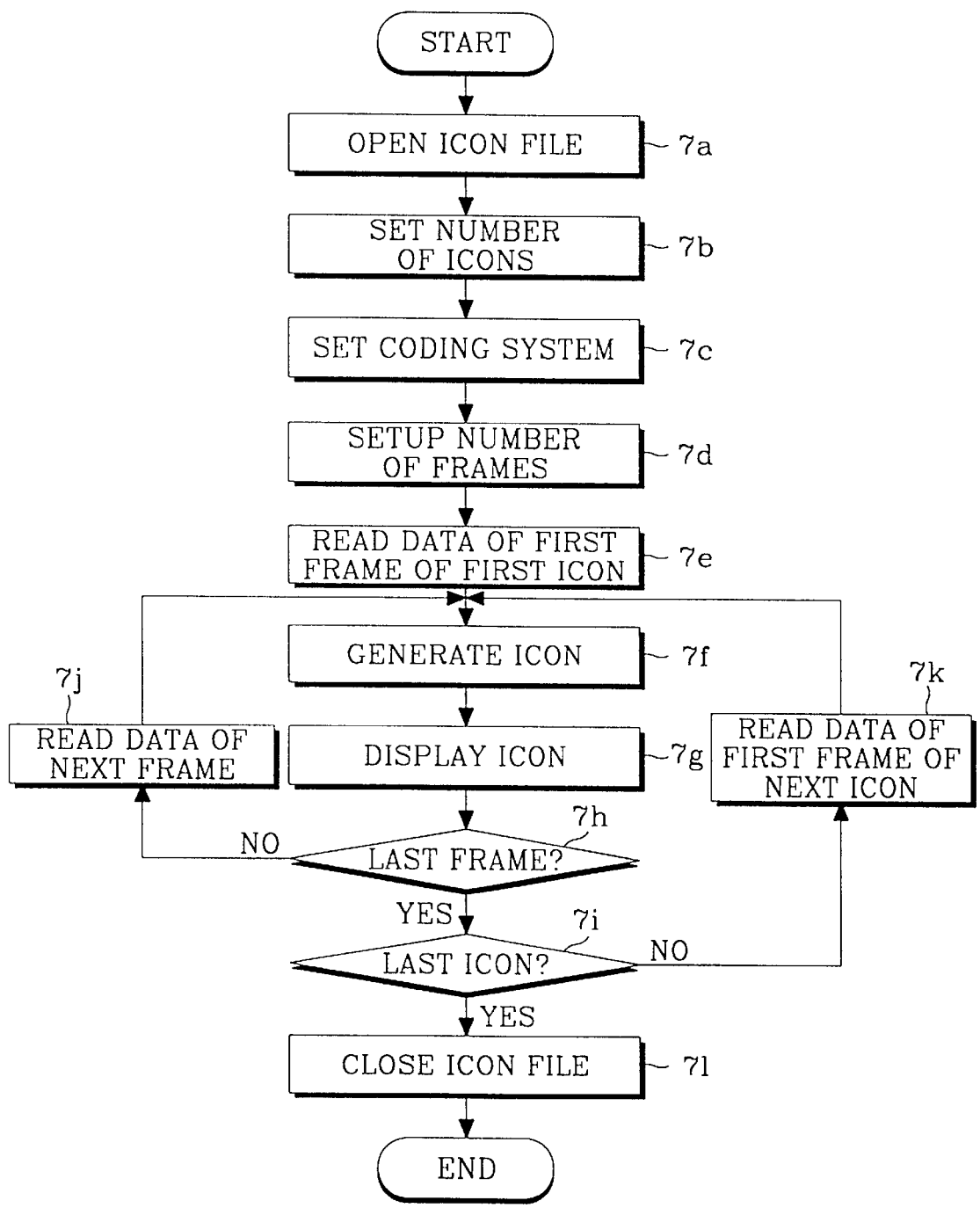
FIG. 7 is a flow chart illustrating a procedure for generating an icon and displaying the icon on a client area.

FIGS. 6A and 6B constitute a flow chart illustrating a procedure for executing the icon contents viewing function, and FIG. 7 is a flow chart illustrating a procedure for generating the icon and displaying the icon on the client area.

A method for making the icon file in order to easily retrieve the moving image information will now be described. The icon for each image file is made through representative frame selecting, compressing and storing processes. To select a representative frame, differences between adjacent frames are compared. That is, the frame having the large difference between adjacent frames is selected as the representative frame by comparing a series of frames constituting the moving image file. To this, a motion vector may be used as criteria of similarity between the frames, or a method using a luminance component may be used. When using the luminance component, frames before and after a difference in the luminance component between two adjacent frames is above a threshold value are selected. The motion vector is useful when the MPEG coding system is used.

When using the JPEG coding system for a still image, a RMS (root means square) is calculated between the luminance components of pixels corresponding to two adjacent frames, and one of frames before and after the difference in the luminance component between adjacent frames exceeds a constant reference value is selected, thereby determining the frame constituting the icon.

In consideration of the convenience of achieving the dynamic icon, it is preferable that the number of the frames constituting the icon is previously determined and only the constant number of the luminance differences is selected from a maximum value. This provides for favorable memory management by assigning the same amount of memory assigned to each icon. Therefore, the selected frames can be compressed up to a factor of one hundred by using an image compression algorithm. The compressed image data is stored in the RAM 54 with the format shown in FIGS. 4A and 4B so as to be displayed on the screen by an icon call at an icon display process. This icon file shows a case where there are three icons.

Meanwhile, if the user performs an operation (the icon contents viewing operation) for spreading the icon appearing on the screen, the icon is spread. Referring to FIG. 6, the message generated by dragging the mouse 52 executes an icon update program 44 (steps 6f to 6m) in a message processing routine of the callback function to change the icon to a spread form. This program calculates a horizontal moving distance by information about an initial pointing position and a current position of the mouse 52. The ratio of a current horizontal moving distance to a maximum movable distance (when the icon is spread to the maximum) is calculated, and the number of frames to be read from the icon file is calculated as follows:

$$N_F = N_I + L_H / L_M \tag{1}$$

where $N_F$ is the number of spread frames, $N_I$ is the number of frames constituting a corresponding icon, $L_H$ is a current horizontal moving distance, and $L_M$ is a maximum movable distance.

If the number of frames to be read is determined, the icon is again drawn in the form of the spread scroll in order to see the contents of the icon and the file is closed. At step 6c, when the user detaches his hand from the pressed left button of the mouse 52, the message corresponding to this event is generated and an icon restoring program 45 (steps 6d and 6e) restores the icon to the original form according to a procedure determined by the callback function.

When slide-showing or reproducing the icon, the icons in the client area 17 of the searching window 10 should be dragged and dropped to an area of the command window. Then a corresponding message is generated and stored in a message queue corresponding to that window. The command window executes a unique command by following a message processing procedure determined by the callback function according to the message. The drag and drop operation at the slide show window 15 causes the image information corresponding to the icon ID selected from the icon file information stored in the form of FIG. 4B to be displayed on that window area one frame by one frame. If a marker EOF (end of frame) appears, the information read for a constant time is displayed on that window area and the image information of the next frame is read. These operations continue until another marker EOI (end of icon) appears. If the marker EOI appears, the reading operation is stopped and the file is closed. For display, the icon ID of icon classification information and information about a display time of one frame are needed. The icon ID is provided as a message form when the mouse 52 selects any icon. The information about the display time of one frame is included in the message processing procedure.

If any icon is dragged and dropped to the play window 16, the play window 16 receives the message including the icon ID. Therefore, the play window 16 performs the procedure necessary for reproducing the image file according to its message processing procedure. To efficiently manage the searching time and storage space, the image file of original image information and the icon file for generating the icon of the image file are separately stored. The icon file is created by selecting only a partial frame among the original image file and made so as to include all the image files. The created icon file has only one file as shown in FIG. 4A, and includes the file header declaring that this file is an icon file, the number of icons, and information about the compression system if there is compressed data. The icon file stores the image data for drawing the icon according to the frame divided by the marker. There is another marker for distinguishing the icon. The marker is defined by 1 or 2 bytes and is distinguished from the image data.

An operation for searching the moving image file will now be described. The moving image file is retrieved when the system is initialized or when there is an open command of the image searching window during other tasks.

In an initialization process of the system, the CPU 53 stores the icon file stored in the external memory 40 in the RAM 55. The image searching window 10 and the command windows 15 and 16 are drawn as shown in FIG. 2 on the screen of the display unit 51 according to a typical window generating procedure of the windows programming. The frame data of each icon is read from the icon file stored in the RAM 54 and generated is the form of the icons 14 on the client area 17 of the image searching window 10.

Referring to FIG. 7, parameter values relating to an instant handle including the icon file and a file name of the icon file are determined and the icon file is opened by calling a bitmap load function LoadBitmap at step 7a. At steps 7b–7d, information about the number of the icons, the coding system and the number of frames is detected and stored in an internal register. The icon is displayed according to the contents of this register. Data of a first frame of a first icon is read at step 7e and a corresponding icon is generated at step 7f. To call an icon generating function, the parameter value about the instant handle of the application programs for generating the icon, the width of the icon, the height of the icon and the number of the bit frames should be determined. At step 7g, the icon is displayed. To call a function for displaying the icon, a display context for drawing the icon should be designated, x and y coordinate values of the left and upper side within this context and the parameter value about the handle of the icon to be drawn should be determined. At step 7h, it is determined whether or not the current frame is the last frame. If it is not the last frame, the data of the next frame is read at step 7j. If the current frame is the last frame of a corresponding icon, it is checked at step 7i whether or not the current icon is the last icon. If not, the data of the first frame of the next icon is read at step 7k. If the current icon is the last icon, the icon file is closed at step 7l.

According to the preferred embodiment of the present invention, since the icon includes various image information, the contents of the image file can be seen by searching only representative scenes selected when the icon is made without loading all the contents of the image file. Meanwhile, the 3-dimensional icon according to the preferred embodiment of the present invention serves as a useful user interface in a system having an image file searching function (e.g., a video server) since the contents of the image file can be intuitionally and rapidly understood.

As noted above, the present invention provides the user interface which can impart a greater intuitional understanding of the contents of the image file in comparison with the conventional 2-dimensional icon by constructing the 3-dimensional icon having the temporal component through a representative minimum image frame. Since a desired function can be implemented by dragging and dropping the icon selected through the command window to a window area instead of giving a command through character input or use of a selection menu, manipulation of the system is more convenient. The representative frame constituting the icon can be automatically extracted by using the luminance component in the JPEG coding system and the motion component in the MPEG coding system as criteria for judging the difference in similarity between adjacent frames according to the compression algorithm of the image data. When searching the image file, the contents of the image file can be rapidly understood by searching only the representative frame of the image file through the dynamic icon stored in the internal memory without reading the entire image file from the external memory. The user can become familiar with the image file by using an animation technique to search the icon file.

It should be understood that the present invention is not limited to the particular embodiment disclosed herein as the best mode contemplated for carrying out the present invention, and that the present invention is not limited to the specific embodiments described in this specification except as defined in the appended claims.

What is claimed is:

1. An apparatus for searching moving image information, said apparatus including an image input device for receiving image information, an external memory for storing said image information, and a compute system having a pointing device, a display unit and an internal memory, said apparatus comprising:

means for creating an icon file by selecting a specific frame of an image file, and storing said icon file in said internal memory;

means for creating a client area in said display unit;

icon control means for displaying the icon file read from said internal memory on a predetermined area of said client area in the form of 3-dimensional animation icons; and command window control means, providing a command windows format, for executing a command corresponding to one of said animation icons which is dragged and dropped in a corresponding command window area by said pointing device, said command window control means being separated from said icons by a given distance, wherein said command window control means comprises at least one of:

show window control means for sequentially displaying still images corresponding to the dragged and dropped icon within a first window area one frame by one frame; and playing window control means for reproducing a moving image file corresponding to the dragged and dropped icon within a second window area.

2. An apparatus as set forth in claim 1, wherein said animation icons have an icon handle taking the form of a scroll, and are spread so that still images corresponding to the icon appear on the display unit when a dragging state of said pointing device is sensed.

3. An apparatus as set forth in claim 1, further comprising; means for determining an amount of data to be read from said memory according to a ratio of a horizontal moving distance between an initial pointing position and a current position of a selected icon to a distance when the selected icon is spread to the maximum, and generating an address.

4. A user interface method for searching moving image information in a computer system having a pointing device, a display unit, and external and internal memories for storing an image file, said user interface method comprising the steps of:

creating an icon file by selecting a specific frame of said image file, and storing said icon file in said internal memory;

creating a main window in said display unit;

creating a plurality of command windows within said main window;

reading one or more specific icon file created in said creating an icon file step from said internal memory according to a moving image information searching command, and generating said specific icon file separated from said command windows by a given distance in the form of a 3-dimensional icon;

executing a corresponding command when an icon is dragged and dropped to any command window area by said pointing device; and performing at least one of:

sequentially displaying still images corresponding to the dragged and dropped icon within a first window area one frame by one frame; and reproducing a moving image file corresponding to the dragged and dropped icon within a second window area.

5. A user interface method for searching moving image information in a computer system having a pointing device, a display unit, and external and internal memories for storing an image file, said user interface method comprising the steps of:

creating an icon file by selecting a specific frame of said image file, and storing said icon file in said internal memory;

creating a main window in said display unit;

creating a plurality of command windows within said main window;

reading one or more specific icon file created in said creating an icon file step from said internal memory according to a moving image information searching command, and generating said specific icon file separated from said command windows by a given distance in the form of a 3-dimensional icon; and executing a corresponding command when an icon is dragged and dropped to any command window area by said pointing device, wherein said step of executing a command is to read still images corresponding to the dragged and dropped icon from said external memory and to sequentially display said still images within a window area one frame by one frame.

6. A user interface method for searching moving image information in a computer system having a pointing device, a display unit, and external and internal memories for storing an image file, said user interface method comprising the steps of:

creating an icon file by selecting a specific frame of said image file, and storing said icon file in said internal memory;

creating a main window in said display unit;

creating a plurality of command windows within said main window;

reading one or more specific icon file created in said creating an icon file step from said internal memory according to a moving image information searching command, and generating said specific icon file separated from said command windows by a given distance in the form of a 3-dimensional icon; and executing a corresponding command when an icon is dragged and dropped to any command window area by said pointing device, wherein said step of executing a command is to read a moving image file corresponding to the dragged and dropped icon from said external memory and to play said moving image file within a window area.

\* \* \* \* \*